(12) United States Patent
Weeks et al.

(10) Patent No.: US 9,578,806 B2
(45) Date of Patent: Feb. 28, 2017

(54) AGRICULTURAL HARVESTER HEADER WITH RETRACTING PADDLES FOR CONVEYING CROP MATERIAL

(71) Applicant: CNH Industrial America LLC, New Holland, PA (US)

(72) Inventors: Matthew D. Weeks, Troupsburg, NY (US); Dillon M. Thompson, New Holland, PA (US); Robert Stewart Boyd, Mount Joy, PA (US)

(73) Assignee: CNH Industrial America LLC, New Holland, PA (US)

( * ) Notice: Subject to any disclaimer, the term of this patent is extended or adjusted under 35 U.S.C. 154(b) by 67 days.

(21) Appl. No.: 14/738,544

(22) Filed: Jun. 12, 2015

(65) Prior Publication Data

US 2016/0360701 A1    Dec. 15, 2016

(51) Int. Cl.
*A01D 34/00* (2006.01)
*A01D 61/00* (2006.01)

(52) U.S. Cl.
CPC .................................. *A01D 61/008* (2013.01)

(58) Field of Classification Search
CPC .... A01D 61/008; A01D 45/021; A01D 41/14; A01D 61/00; A01D 57/00; A01F 12/10; B65G 65/22; B65G 65/46
USPC .................... 56/14.5, 158; 198/513, 669, 608
See application file for complete search history.

(56) References Cited

U.S. PATENT DOCUMENTS

| | | | | |
|---|---|---|---|---|
| 2,390,680 A | * | 12/1945 | Ausherman | A01D 61/00 198/513 |
| 2,476,265 A | * | 7/1949 | Peterson | A01D 61/008 198/513 |
| 2,506,980 A | | 5/1950 | Verger | |
| 2,653,701 A | * | 9/1953 | Heth | A01D 61/008 198/608 |
| 2,893,537 A | * | 7/1959 | Krahn | A01D 41/10 198/512 |
| 2,910,819 A | * | 11/1959 | Helliwell | A01D 57/04 56/220 |
| 2,934,881 A | * | 5/1960 | Noble | A01D 61/008 198/513 |
| 2,935,193 A | * | 5/1960 | Karlsson | A01D 45/02 209/136 |
| 3,233,395 A | * | 2/1966 | Dahl | A01D 57/30 198/657 |
| 3,324,639 A | * | 6/1967 | Halls | A01D 43/10 56/1 |
| 3,603,008 A | * | 9/1971 | Heth | E01H 5/098 198/513 |

(Continued)

FOREIGN PATENT DOCUMENTS

EP    GB 2200526 A  *  8/1988  ............. A01D 41/06

*Primary Examiner* — Árpád Fábián-Kovács
(74) *Attorney, Agent, or Firm* — Patrick M. Sheldrake

(57) ABSTRACT

An agricultural harvester includes a header with an infeed assembly including a driving element configured to rotate; a cylinder rotationally coupled to the driving element and having a plurality of openings formed therein; and a paddle assembly eccentrically positioned and rotationally held within the cylinder. Each paddle assembly includes a plurality of paddles variably positioned through the openings in the cylinder. Each paddle includes a laterally slidable wing that withdraws into the cylinder when the paddle retracts into the cylinder, and slides outwardly as the paddle extends form the cylinder.

20 Claims, 11 Drawing Sheets

(56) References Cited

U.S. PATENT DOCUMENTS

| | | | | |
|---|---|---|---|---|
| 3,945,178 | A | * | 3/1976 | Delfosse .................. A01F 12/18 460/108 |
| 4,148,175 | A | * | 4/1979 | Miller ..................... A01D 57/22 56/13.7 |
| 4,170,235 | A | * | 10/1979 | Ashton ................... A01F 12/10 460/16 |
| 4,487,004 | A | | 12/1984 | Kejr |
| 4,550,554 | A | | 11/1985 | Lundahl et al. |
| 4,597,510 | A | * | 7/1986 | Durant ................... B65G 65/46 198/669 |
| 4,663,921 | A | * | 5/1987 | Hagstrom .............. A01D 41/14 460/16 |
| 5,005,343 | A | * | 4/1991 | Patterson ............... A01D 57/20 56/14.4 |
| 6,093,099 | A | * | 7/2000 | Groff ................... A01D 61/008 460/32 |
| 6,272,821 | B1 | * | 8/2001 | Wigdahl ................ A01D 46/08 56/16.5 |
| 7,757,415 | B2 | * | 7/2010 | Manion .................. E01H 4/023 299/24 |
| 8,118,652 | B2 | * | 2/2012 | Hollatz .................... A01F 7/06 460/113 |
| 2006/0185340 | A1 | | 8/2006 | Eyre |
| 2008/0282661 | A1 | * | 11/2008 | Gengenbach ........ A01D 45/021 56/119 |
| 2009/0111545 | A1 | * | 4/2009 | Pope ....................... A01F 12/52 460/14 |
| 2012/0011820 | A1 | * | 1/2012 | Olander ................. A01D 57/00 56/17.3 |
| 2012/0047864 | A1 | * | 3/2012 | Lohrentz ............. A01D 45/021 56/95 |

\* cited by examiner

AGRICULTURAL HARVESTER HEADER WITH RETRACTING PADDLES FOR CONVEYING CROP MATERIAL

BACKGROUND OF THE INVENTION

1. Field of the Invention

The present invention relates to agricultural harvesters, and, more particularly, to header assemblies for agricultural harvesters.

2. Description of the Related Art

Combines are used to harvest agricultural crops such as corn, soybeans, wheat and other grain crops. As the combine is driven through a crop field, the combine cuts the crop, separates the desired crop from the undesired waste, stores the crop, and discards the waste.

In a typical combine, a header is mounted at the front of the combine to gather the crop and feed the crop into the combine for processing. In a continuous process as the combine is driven through the field, the crop material is collected by the header, deposited into a feeder housing and transported upwardly into the combine by a feed elevator located within the feeder housing. The crop material then passes through a threshing and separating mechanism in which the crop material is impacted and/or rubbed, thereby causing the grain to separate from the stalk material. In a rotary combine, the threshing and separating mechanism includes a rotor, a threshing concave, a rotor cage and a separating grate; however, many types of combines are known that perform similar functions using different mechanisms. The stalk material that is separated from the grain is commonly referred to as material other than grain (MOG).

After passing through the threshing and separating assembly, the grain and MOG are deposited onto a grain cleaning system to separate the grain from the MOG. The grain cleaning system typically includes a plurality of adjustable, reciprocating cleaning sieves, often referred to as a chaffer sieve and a shoe sieve. To further separate the grain from the MOG, a cleaning fan or blower is positioned to blow air up through the cleaning sieves. The flow of air tends to blow the MOG, which is typically lighter than grain, out the back of the combine. Grain, which typically is heavier than MOG, is allowed to drop through the openings in the sieves.

The clean grain that falls through the cleaning sieves is deposited on a collection panel positioned beneath the cleaning sieves. The collection panel is angled so as to permit the grain to flow, under the influence of gravity, into an auger trough positioned along the lowermost edge of the collection panel. The grain collected in the auger trough is then moved by an auger towards the side of the combine where it is raised by a grain elevator and deposited into a storage tank or grain tank.

The header is designed to cut a swath in the crop of substantial width, and to convey the cut crop material into the feeder housing, typically the feeder housing being substantially narrower than the swath width cut by the header. An infeed assembly can be included in the header to direct the cut crop material from the outer portions of the header into a middle area of the header for movement into the feeder housing for transport to the threshing and separating mechanism. It is known to use opposed feed augers having helically oriented flights to convey the cut crop material laterally inward toward the center of the header. Center support structures are provided for the conveying augers. The opposed feed augers operating with necessary support structures and the associated part stack up create a center zone without positive crop material conveyance by the augers. While the conveyed crop material will urge other crop material through the zone and into the feeder housing, under some conditions, crop material can stagnate in a re-circling pattern within the center zone, thereby hindering movement of the crop material into the feeder housing. However, the presence of supporting structure makes it difficult to install mechanism to positively move the crop material through the center zone and into the feeder housing.

What is needed in the art is an infeed assembly that can overcome some of the previously described disadvantages of the prior art.

SUMMARY OF THE INVENTION

The present invention provides an infeed assembly having a rotatable cylinder with openings formed therein, and a paddle unit rotationally held in the cylinder, the paddle unit having at least one pivoting paddle extending out of an opening of the cylinder, the paddle further having a sliding wing or edge portion.

The invention in one form is directed to an agricultural harvester including: a chassis; a threshing and separating mechanism carried by the chassis; a feeder housing carried by the chassis and configured to supply crop material to the threshing and separating mechanism; and a header carried by the chassis in front of the feeder housing. The header includes a cutting mechanism configured to cut crop material and an infeed assembly carried behind the cutting mechanism configured to direct the cut crop material toward the feeder housing. The infeed assembly includes a driving element configured to rotate; a cylinder rotationally coupled to the driving element, the cylinder having at least one cylinder slot formed therein. A paddle assembly is eccentrically positioned and rotationally held within the cylinder. The paddle assembly includes a paddle hub assembly having at least one paddle extending at least partially out of the cylinder slot during rotation. A laterally slidable wing is connected to the paddle in a varying overlapping relationship as the cylinder is rotated.

The invention in another form is directed to an infeed assembly for a header of an agricultural harvester including a driving element configured to rotate; a cylinder rotationally coupled to the driving element and having a plurality of cylinder slots formed therein; and a paddle assembly eccentrically positioned and rotationally held within the cylinder. The paddle assembly includes a plurality of paddles each variably positioned through a different one of the cylinder slots dependent on a rotational position of the driving element. Each paddle has a laterally slidable wing connected thereto in a varying overlapping relationship dependent on the rotational position.

The invention in yet another form is directed to an infeed assembly for a header of an agricultural harvester, including a driving element configured to rotate; first and second opposed helical flights rotationally connected to the driving element, and a paddle conveyor assembly positioned between the first and second helical flights. The paddle conveyor assembly includes a cylinder rotationally coupled to the driving element and having a plurality of cylinder slots formed therein. A paddle assembly is positioned eccentrically and is rotationally held within the cylinder. The paddle assembly includes a plurality of paddles each variably positioned through a different one of the cylinder slots dependent on a rotational position of the driving element. Each paddle has a laterally slidable wing connected thereto in a varying overlapping relationship dependent on the rotational position.

An advantage of the present invention is that a conveyance rate of cut crop material toward the feeder housing of an agricultural harvester can be increased.

Another advantage is that the paddles can operate closely to the augers to minimize the size of any stagnant zone that otherwise would be without positive material conveyance.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

The terms "grain", "straw" and "tailings" are used principally throughout this specification for convenience, but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
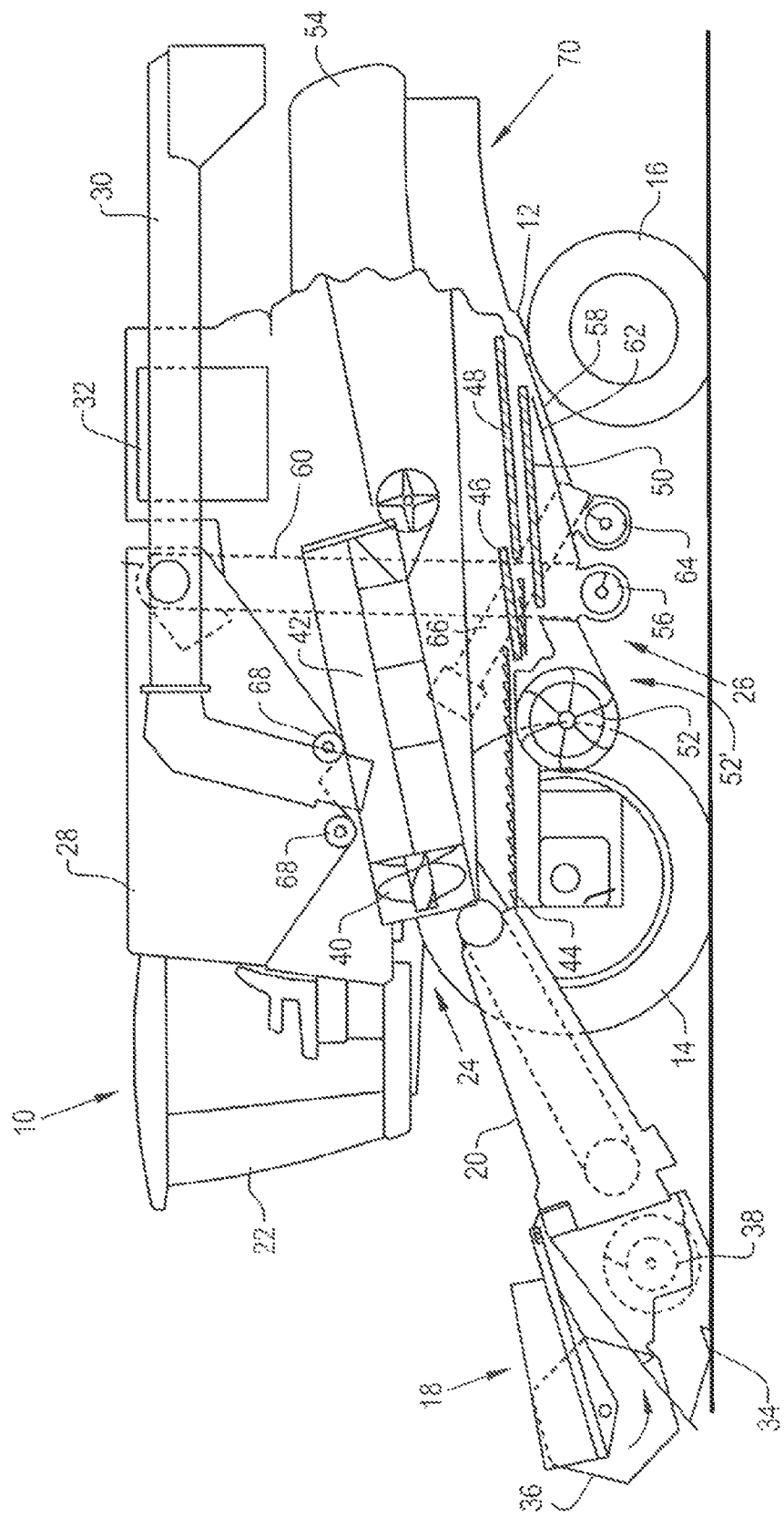
FIG. 1 is a perspective view of an embodiment of an agricultural harvester according to the present invention.

Referring now to the drawings, and more particularly to FIG. 1, there is shown an agricultural harvester in the form of a combine 10, which generally includes a chassis 12, sets of ground engaging front wheels 14 and rear wheels 16, a header 18, a feeder housing 20, an operator cab 22, a threshing and separating system 24, a cleaning system 26, a grain tank 28, and an unloading auger 30. It should be appreciated that while the agricultural harvester is shown as combine 10, the agricultural harvester according to the present invention can be any type of construction that allows for crop material to be harvested, such as a conventional combine (which does not have a rotor), a rotary combine, a hybrid combine, a chopper harvester, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutting mechanism shown as a cutter bar 34 for severing crops from a field during forward motion of combine 10. A rotatable reel 36 feeds the crop into header 18, and a double auger 38 feeds the severed crop laterally inwardly from each side toward the center, in front of feeder housing 20. While rotatable reel 36 is shown for feeding crop material into header 18, it should be appreciated that rotatable reel 36 is optional. Feeder housing 20 conveys the cut crop material to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain that has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve) and a lower sieve 50 (also known as a shoe sieve), and a cleaning fan 52. Grain on sieves 46, 48 and 50 is subjected also to cleaning from an air cleaning system 52', which includes a fan 52 providing a stream of air flowing through the sieves to remove chaff and other impurities such as dust from the grain by entraining such lighter impurities for downstream discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from a bottom pan 62 of cleaning system 26. Clean grain auger 56 conveys the clean grain laterally to a generally vertically arranged elevator 60, which can also be referred to as a grain elevator, for transport to grain tank 28. Tailings from cleaning system 26 fall to a tailings auger trough 58. The tailings are transported via a tailings auger 64 and a return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The non-grain crop material proceeds through a residue handling system 70. Residue handling system 70 may include a chopper, counter knives, a windrow door and a residue spreader.

Figure 2:
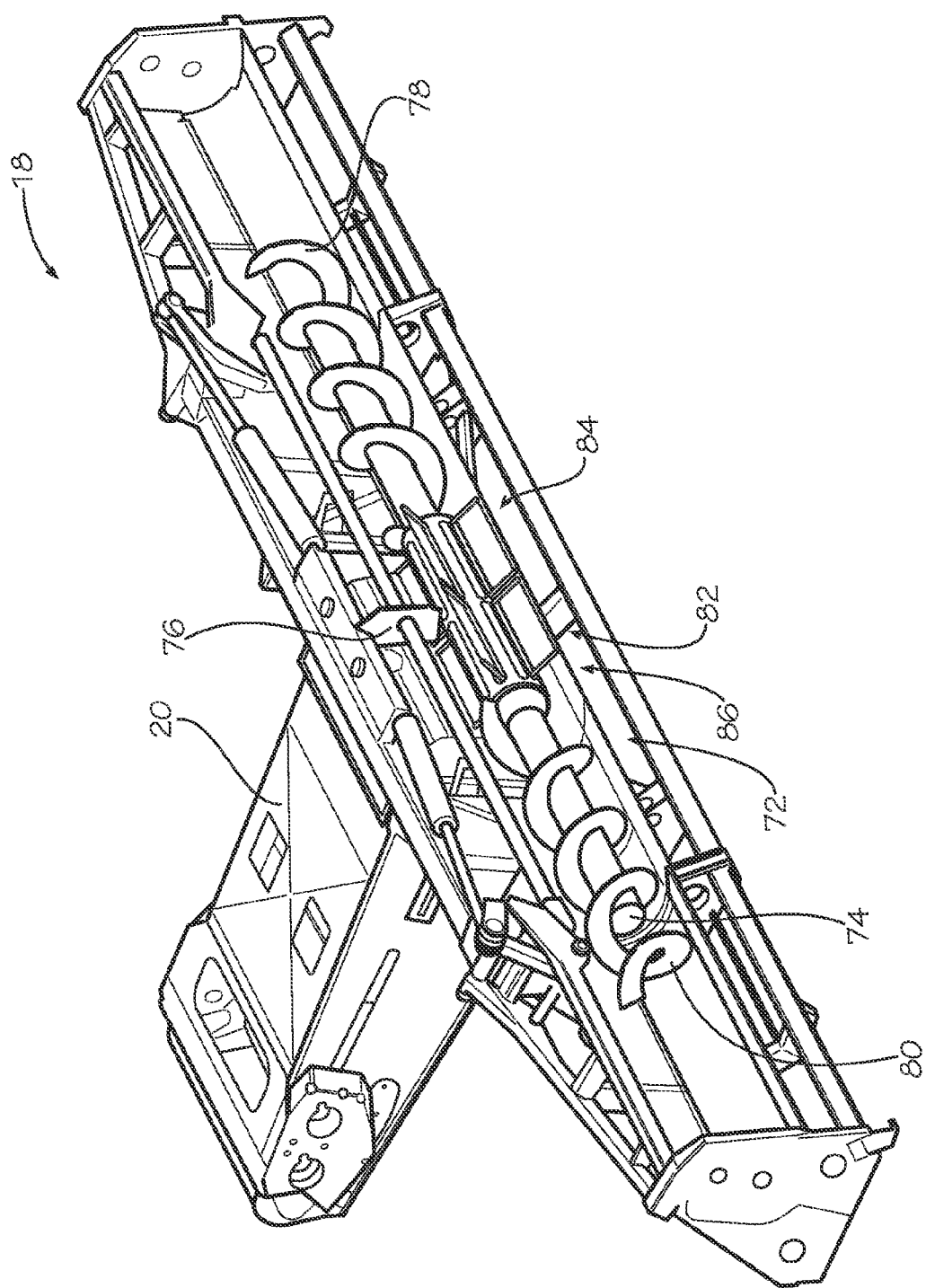
FIG. 2 is a perspective view of a portion of the agricultural harvester shown in FIG. 1, with portions cut away to show interior detail.

Referring now to FIG. 2, header 18 and feeder housing 20 are shown with portions cut away to show interior detail. As can be seen in FIG. 2, header 18 includes an infeed assembly 72 held behind cutter bar 34 (FIG. 1). Infeed assembly 72 directs cut crop material toward feeder housing 20, and generally includes a driving element 74, shown as a drive shaft, configured to rotate about an axis transverse to combine 10. At least in part, driving element 74 is held by a supporting structure 76 generally near the center of infeed assembly 72. Left and right helical flights 78 and 80 are carried by driving element 74 and are configured to convey crop material toward the center of infeed assembly 72 upon rotation of driving element 74. As can be appreciated from the embodiment shown in FIG. 2, the inner ends of left and right helical flights 78, 80 terminate some distance from support structure 76, and some distance from one another.

A paddle conveyor assembly 82 is operatively positioned within the space between the inner ends of left and right helical flight 78, 80. Paddle conveyor assembly 82 includes left and right paddle conveyors 84, 86 operatively coupled with drive element 74 on opposite sides of supporting structure 76. Accordingly, left paddle conveyor 84 operates between supporting structure 76 and the inner end of left helical flight 78, and right paddle conveyor 86 operates between supporting structure 76 and the inner end of right helical flight 80.

Figure 3:
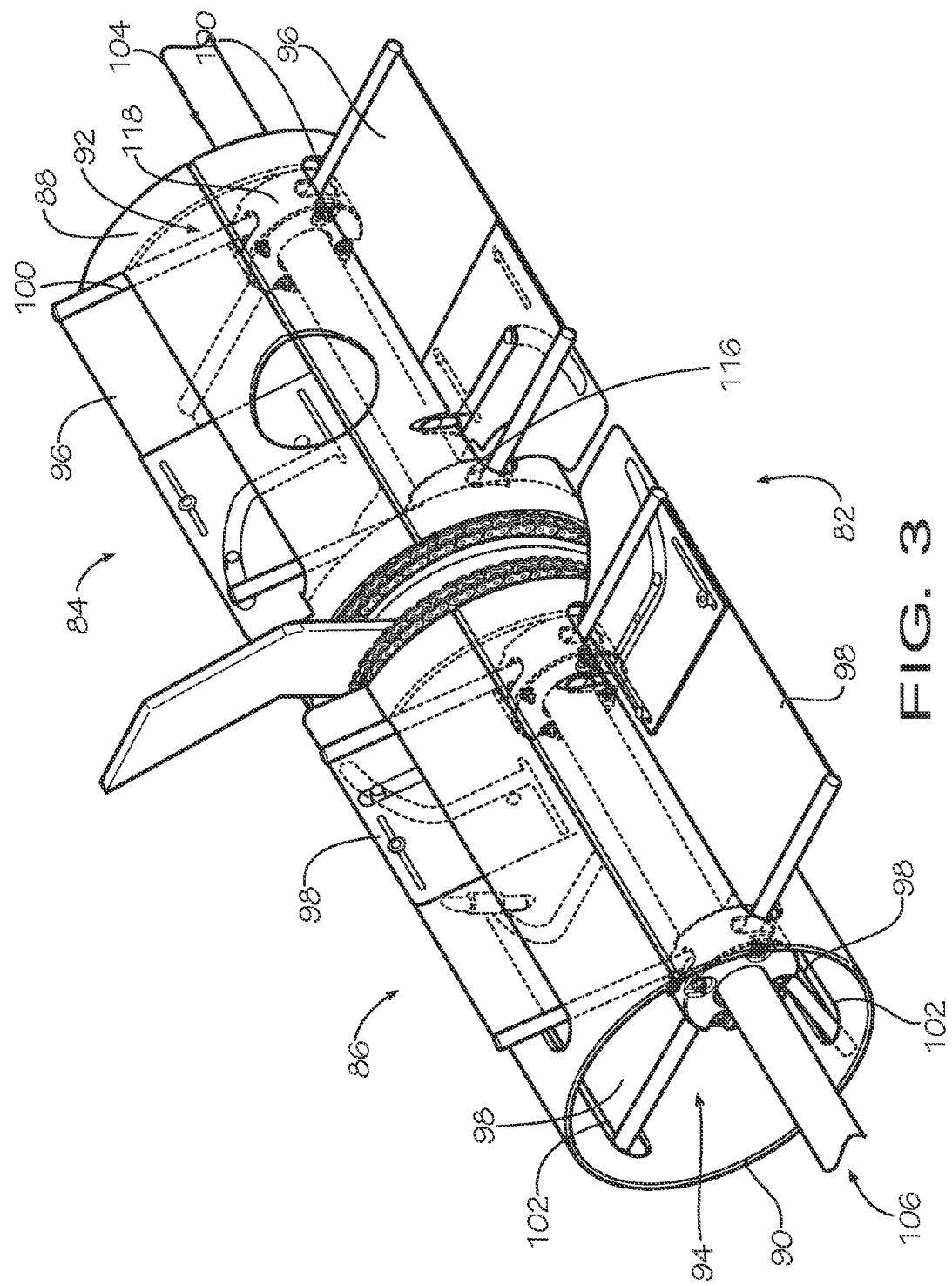
FIG. 3 is a perspective view of an embodiment of a paddle conveyor assembly shown in FIG. 2.

Referring now to FIG. 3, each paddle conveyor 84, 86 includes a cylinder 88, 90, respectively, and a paddle assembly 92, 94, respectively, operative with the cylinder 88, 90 associated therewith. Accordingly, paddle assembly 92 operates within cylinder 88 and paddle assembly 94 operates within cylinder 90. Cylinders 88, 90 are rotationally coupled to driving element 74 for rotation together with rotation of helical flights 78 and 80. Each paddle assembly 92, 94 includes a plurality of paddles 96, 98, respectively. In the exemplary embodiment shown, paddle assembly 92 includes four paddles 96 and paddle assembly 94 includes four paddles 98. While each paddle assembly 92, 94 is shown to include four paddles in the exemplary embodiment, it should be understood that more paddles or fewer paddles can be used. Cylinders 88, 90 each defines a plurality of elongated, axially oriented cylinder slots 100, 102 therein. In the exemplary embodiment shown, cylinders 88, 90 each define for slots, one for each of the four paddles 96, 98 operational therein. Each paddle 96, 98 of each paddle assembly 92, 94 is operatively associated with a different cylinder slot of the pluralities of cylinder slots slot 100, 102 defined in cylinders 88, 90 respectively. That is, each paddle 96 is operatively associated with a different slot 100 and each paddle 98 is operatively associated with a different slot 102, paddles 96, 98 being extendable and retractable relative to cylinders 80, 90 through slots 100, 102. Slots 100, 102 are of sufficient length and width to accommodate paddles 96, 98 sliding therein. Further, slots 100, 102 are of sufficient slot width to accommodate paddles 96, 98 sliding therein at changing angular orientations with respect to slots 100, 102, as will be described hereinafter.

Cylinders 88, 90 are rotationally coupled to driveshaft 74 such that rotation of driveshaft 74 causes rotation of cylinders 88, 90. Cylinders 88, 90 can be coupled to driveshaft 74 in an orientation in which driveshaft 74 defines each cylinder axis of each cylinder 88, 90. Cylinders 88, 90 can be directly coupled to driveshaft 74 but can also be indirectly coupled to driveshaft 74, if desired.

Figure 4:
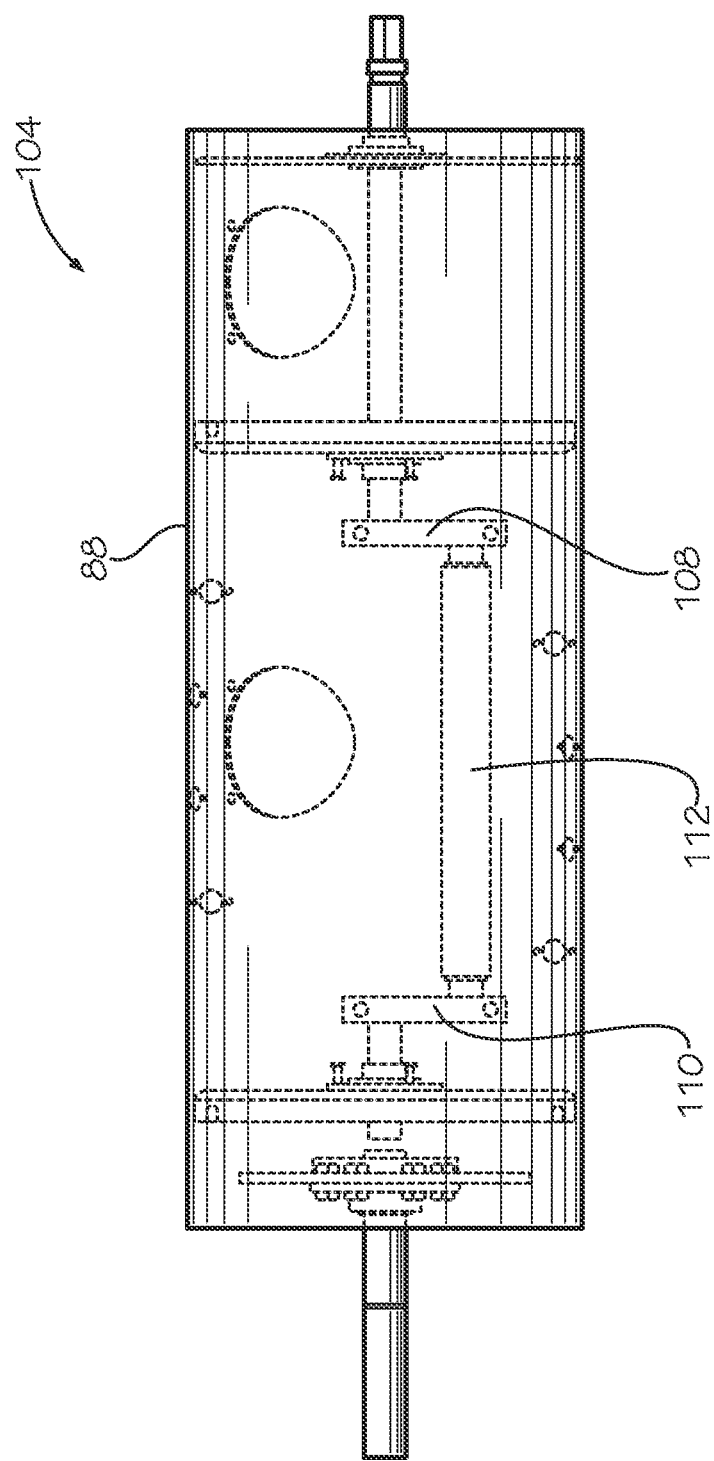
FIG. 4 is an elevational view of a portion of the paddle conveyor assembly shown in FIGS. 2 & 3.
Figure 6:
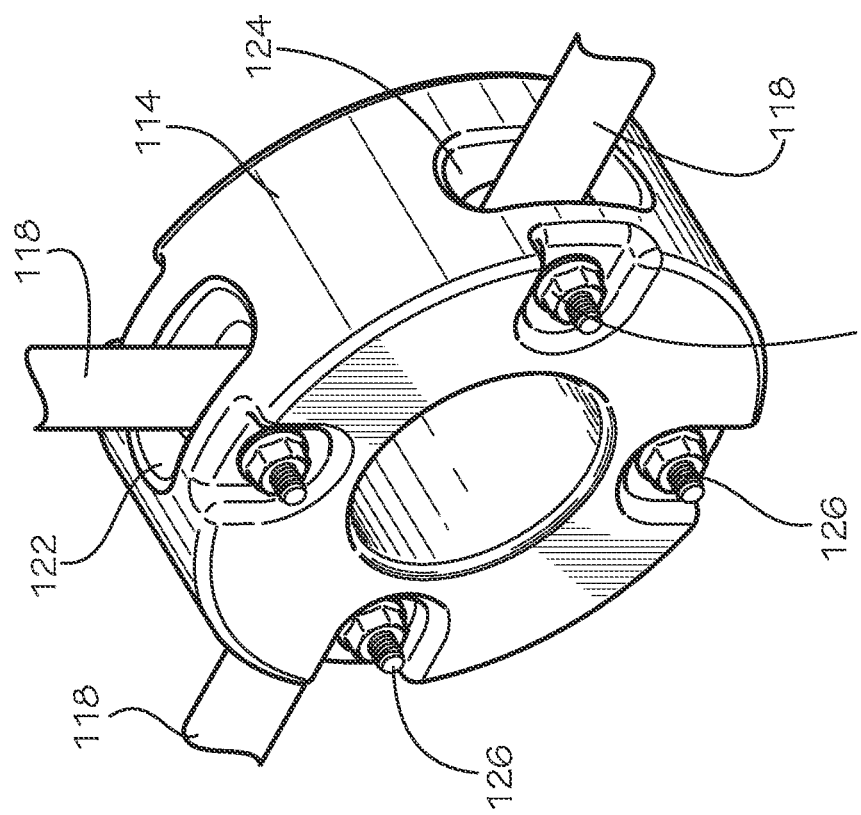
FIG. 6 is a enlarged perspective view of another hub collar in the paddle conveyor assembly.
Figure 5:
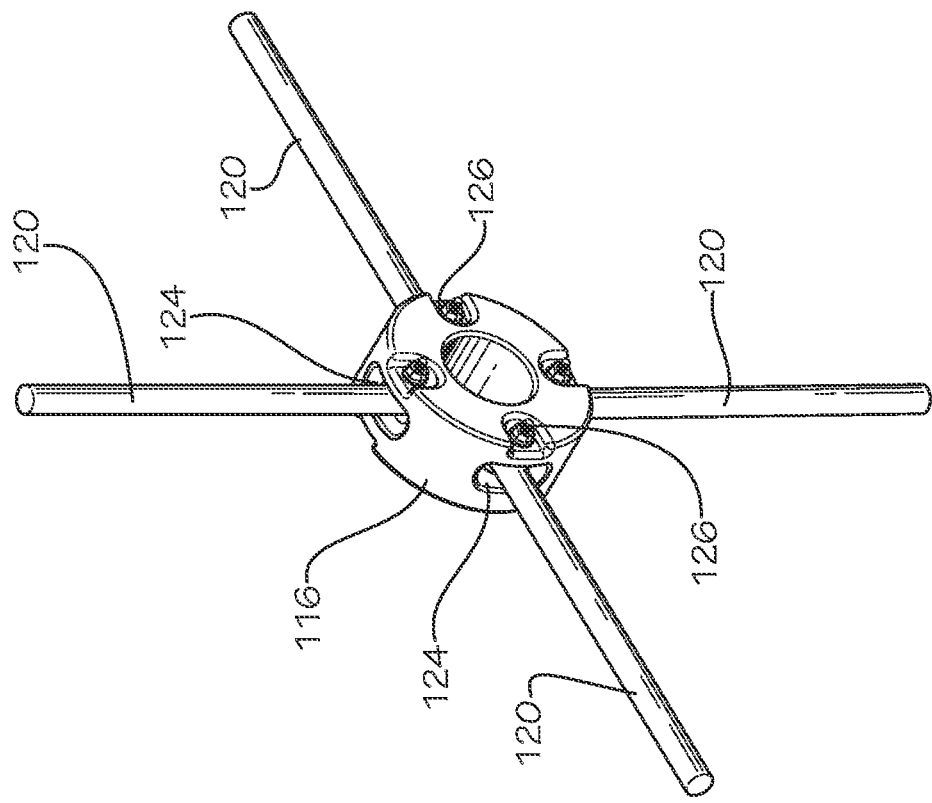
FIG. 5 is a perspective view of a hub collar in the paddle conveyor assembly.

Pluralities of paddles 96, 98 are connected to paddle hub assemblies 104, 106 within cylinders 88, 90 respectively. Paddle hub assemblies 104, 106 are parallel to but offset from the rotational axis of driving element 74. With reference now to FIG. 4, paddle hub assembly 104 is shown, and it should be understood that paddle hub assembly 106 is constructed similarly to paddle hub assembly 104, as will be described. In the exemplary embodiment shown, each paddle hub assembly 104, 106 includes offset links 108, 110 and hub shaft 112 extending between offset links 108, 110. Hub collars 114, 116 are rotatable relative to offset links 108, 110. Each paddle 92, 94 includes paddle legs 118, 120 at opposite ends thereof, the distal ends of paddle legs 118, 120 being held in pivot apertures 122, 124 defined in hub collars 114, 116 respectively. Pivot pins 126 secure each paddle leg 118, 120 in its respective pivot aperture 122, 124, as shown in FIGS. 5 & 6. It should be understood that the connection arrangement shown is merely exemplary, and other types of connections in mountings also can be used.

Figure 7:
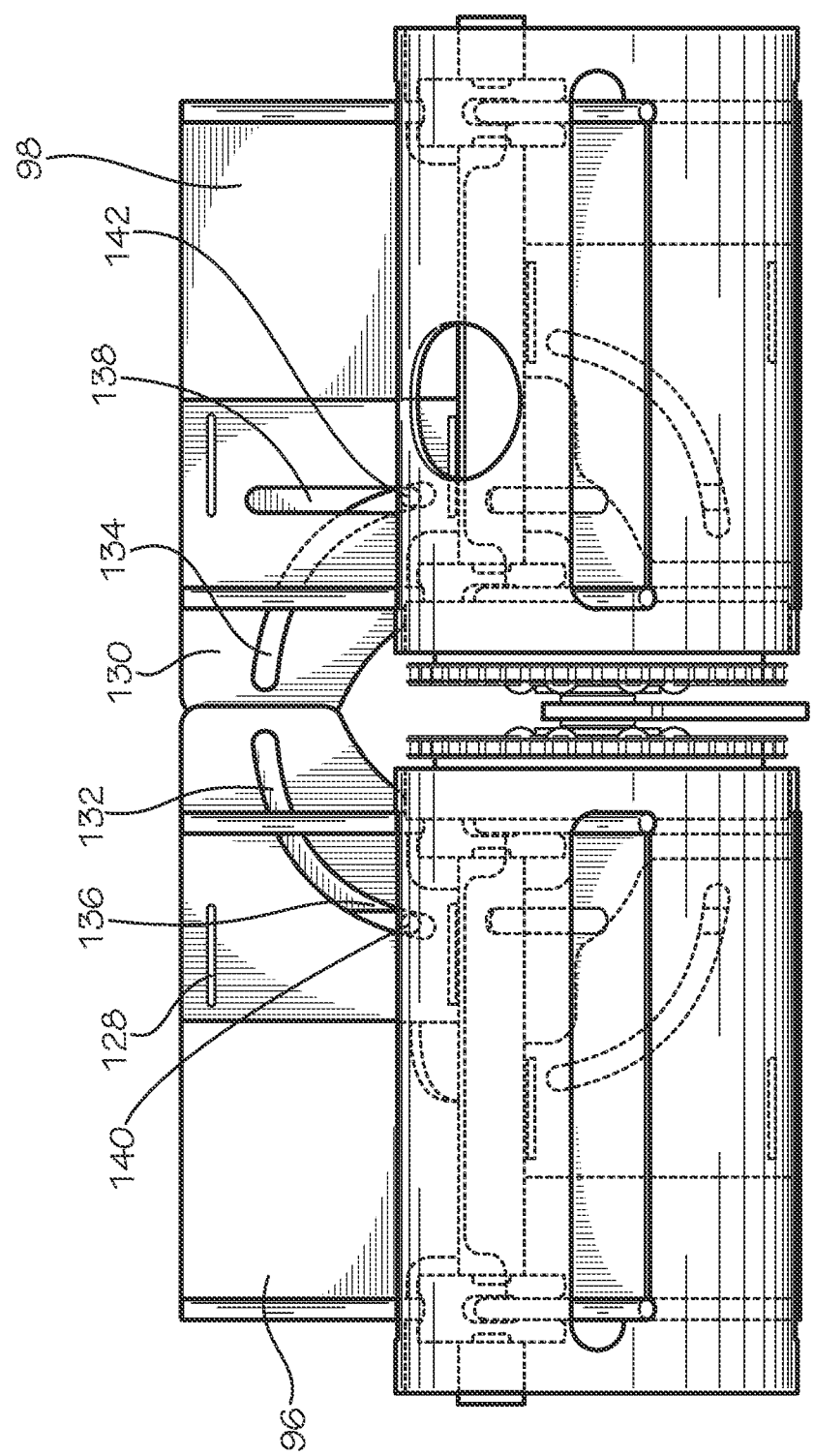
FIG. 7 is a top view of the paddle conveyor assemble.

With reference now to FIG. 7, each paddle 96, 98 has a different laterally extending, slidable wing 128, 130 operating therewith. Accordingly, each paddle 96 is operationally associated in an at least partially overlapping relationship with a different wing 128 and each paddle 98 is operationally associated in an at least partially overlapping relationship with a different wing 130. Each wing 128, 130 has a substantially straight front or outer edge and an inwardly curved side edge. Each wing 128, 130 defines therein an arcuate slot 132, 134 generally following the curved shape of the side edge thereof from near the forward edge of the wing to near the base of the wing. Paddles 96, 98 define guiding slots 136, 138 crossed by arcuate slots 132, 134 respectively. A roller 140, 142 is provided at a fixed location along each cylinder slot 100, 102, respectively. Rollers 140, 142 engage arcuate slots 132, 142 and guiding slots 136, 138. Accordingly, for each paddle 96 and its associated paddle wing 128, a roller 140 extends through the arcuate slot 132 and guiding slot 136; and for each paddle 98 and its associated paddle wing 130, a roller 142 extends through the arcuate slot 134 and guiding slot 138. Rollers 140, 142 are fixed in axial positions along cylinders slots 100, 102.

During use of combine 10, driving element 74 is rotated, thereby rotating left and right helical flights 78, 80 to convey cut crop material toward paddle conveyor assembly 82. While the driving element 74 is shown as being a drive shaft of an auger, it is contemplated that the driving element 74 can be any type of rotating element. Cylinders 88 and 90 also are coupled to driving element 74 such that rotation of the driving element 74 causes rotation of cylinders 88, 90. Cylinders 88, 90 can be coupled to driving element 74 in an orientation where the drive shaft defines a cylinder axis of rotation about which the cylinders rotate. Cylinders 88, 90 have been described as being directly coupled to the driving element 74, but can also be indirectly coupled to the driving element 74 if desired.

Paddle hub assemblies 104, 106 are held in cylinders 88, 90 such that hub shafts 112, 114 define hub axes of rotation parallel to and offset from the axes of rotation of cylinders 88, 90. The offset, eccentric orientation allows the positions of paddles 96, 98 relative to cylinders slots 100, 102 to shift as cylinders 88, 90 and paddle assemblies 92, 94 rotate. The hub shafts 112 can be fixedly held without rotation, with only hub collars 114, 116 rotating relative thereto.

In operation, the driving element 74 is rotated in a direction of rotation that is clockwise when viewed from the right side of combine 10. This operates helical flights 78, 80 to convey cut crop material anywhere along the width of header 18 toward the center of header 18. Since cylinders 88, 90 are rotationally coupled to driving element 74; cylinders 88, 90 will also rotate as the driving element rotates.

Figure 8A:
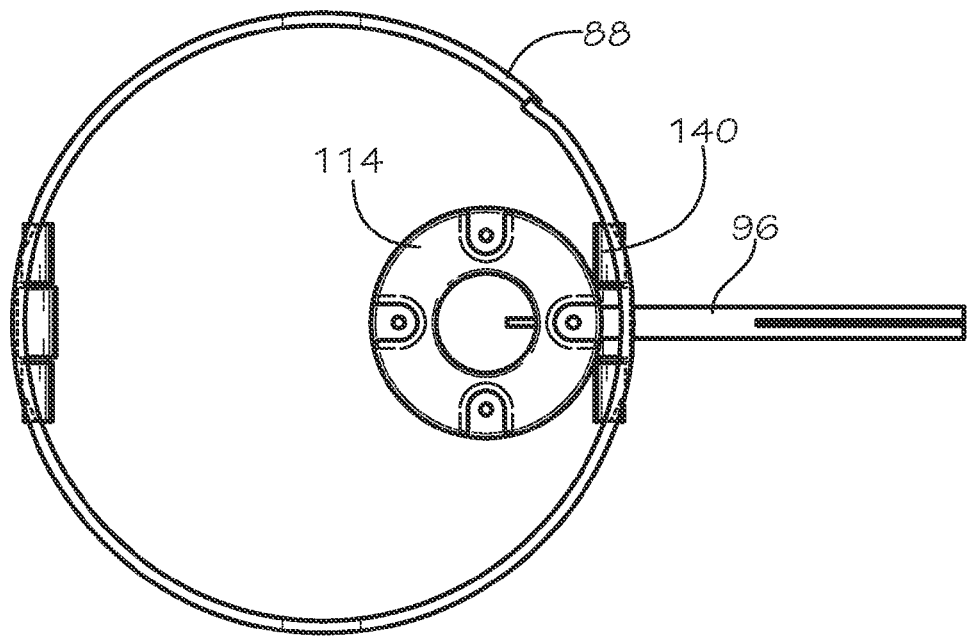
FIG. 8A is a fragmentary, cross-sectional view of a cylinder and paddle assembly in a first rotated position.
Figure 8B:
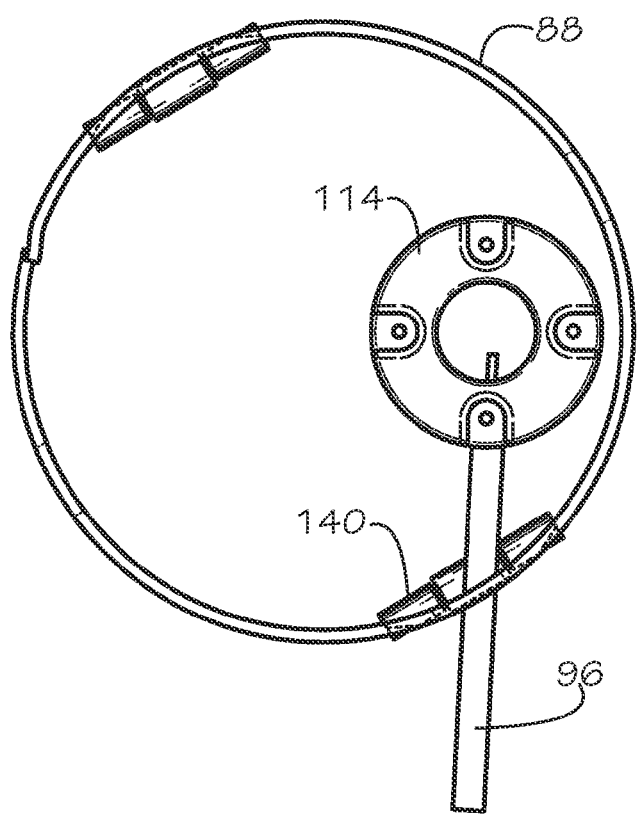
FIG. 8B is a fragmentary, cross-sectional view of the cylinder and paddle assembly in a second rotated position.
Figure 8C:
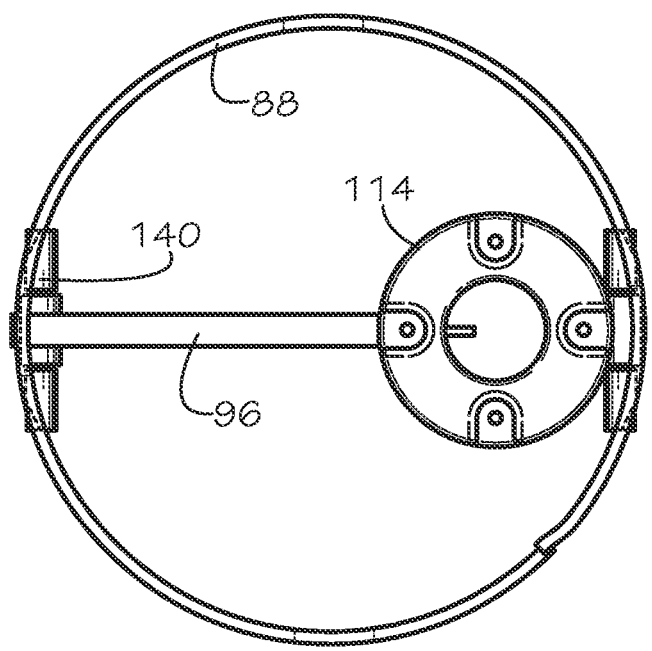
FIG. 8C is a fragmentary, cross-sectional view of the cylinder and paddle assembly in a third rotated position.
Figure 8D:
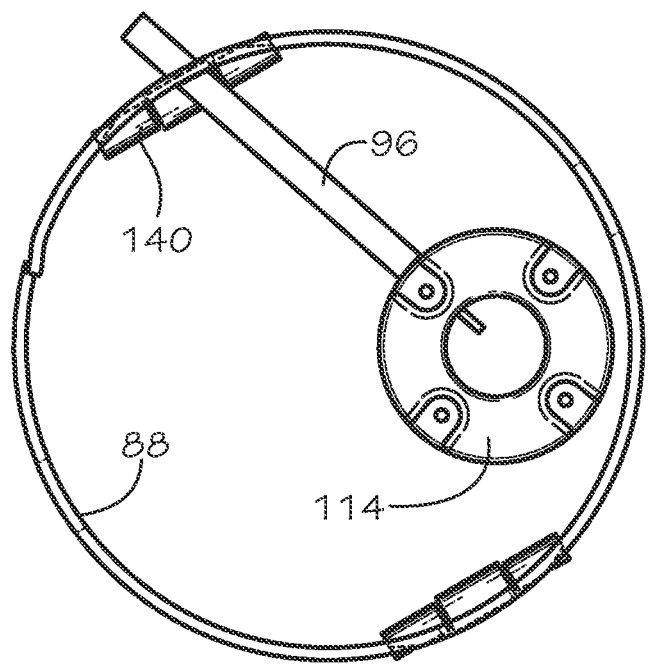
FIG. 8D is a fragmentary, cross-sectional view of the cylinder and paddle assembly in a fourth rotated position.
Figure 9A:
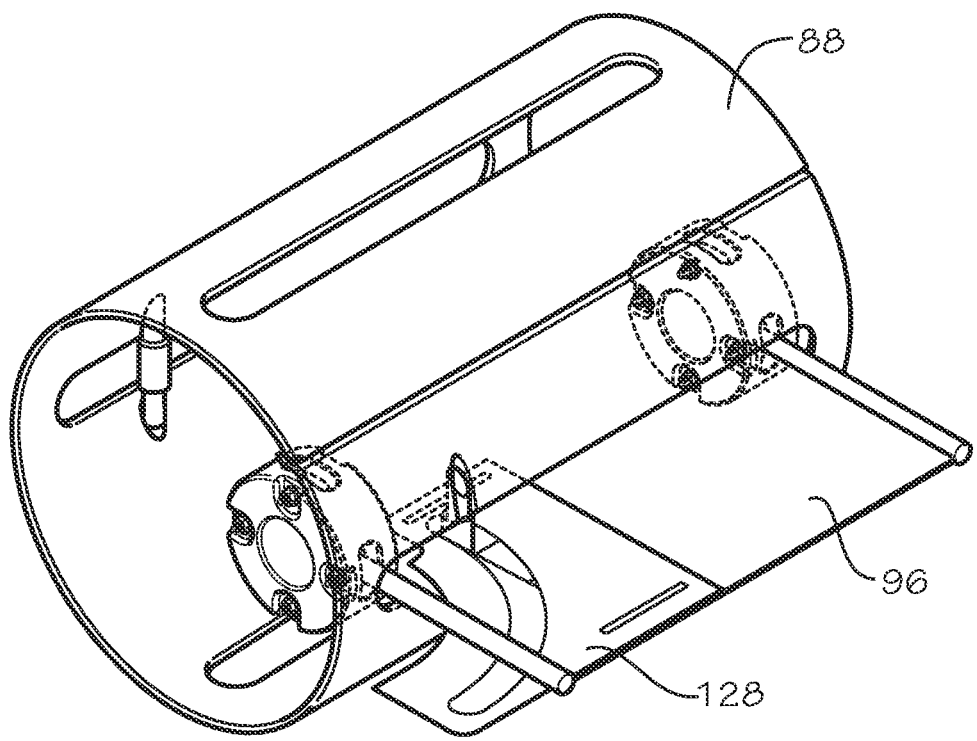
FIG. 9A is a perspective view of the cylinder and paddle assembly in the first rotated position as shown in FIG. 8A.
Figure 9B:
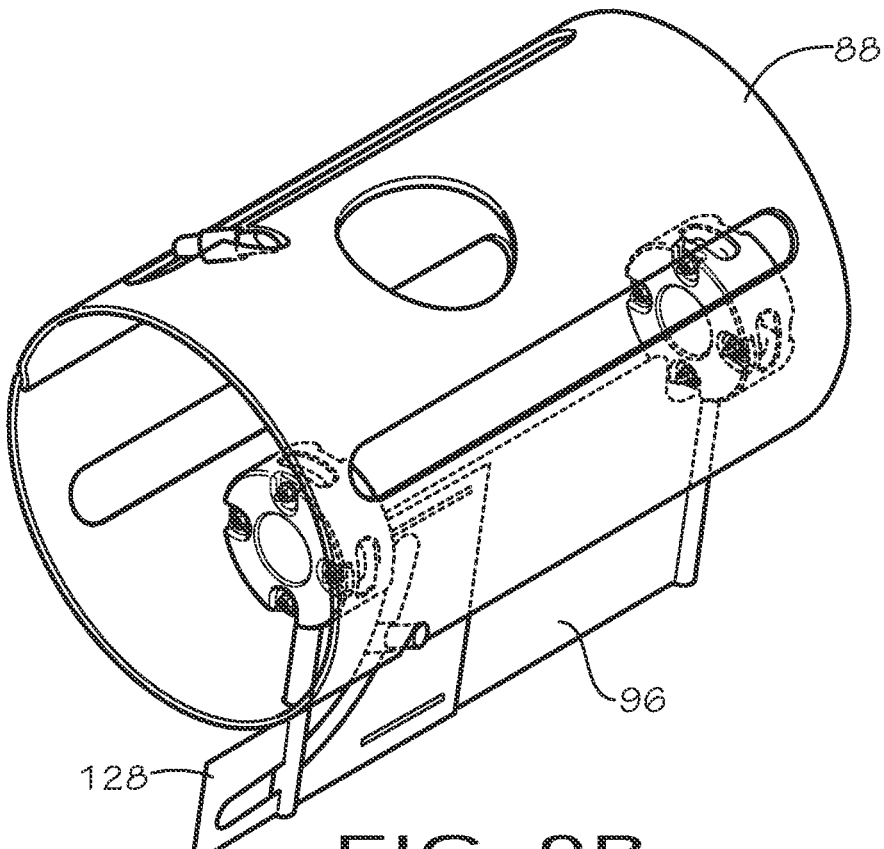
FIG. 9B is a perspective view of the cylinder and paddle assembly in the second rotated position as shown in FIG. 8B.
Figure 9C:
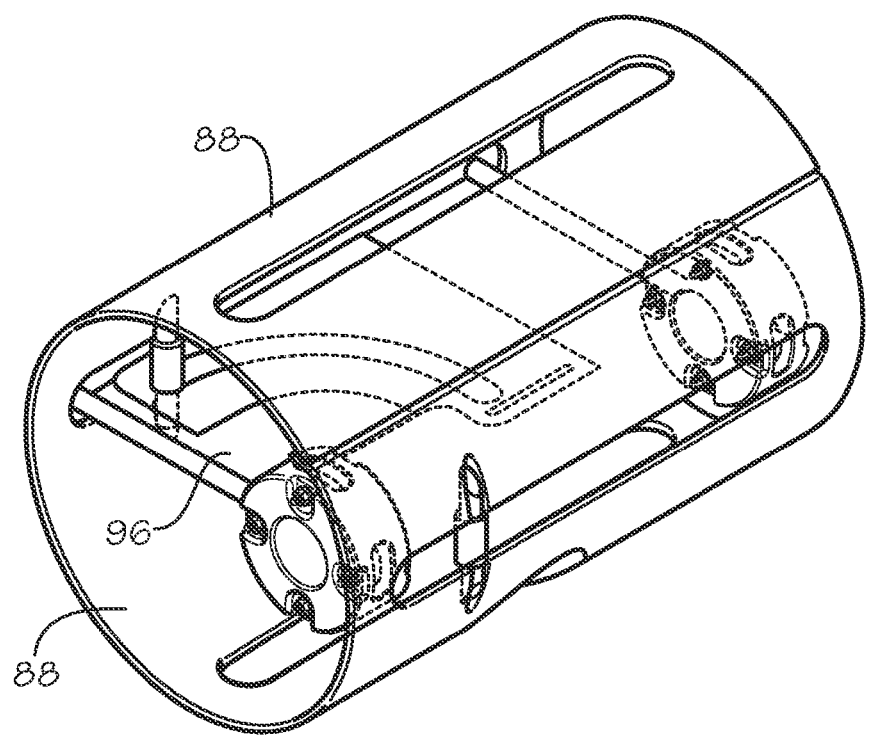
FIG. 9C is a perspective view of the cylinder and paddle assembly in the third rotated position as shown in FIG. 8C.
Figure 9D:
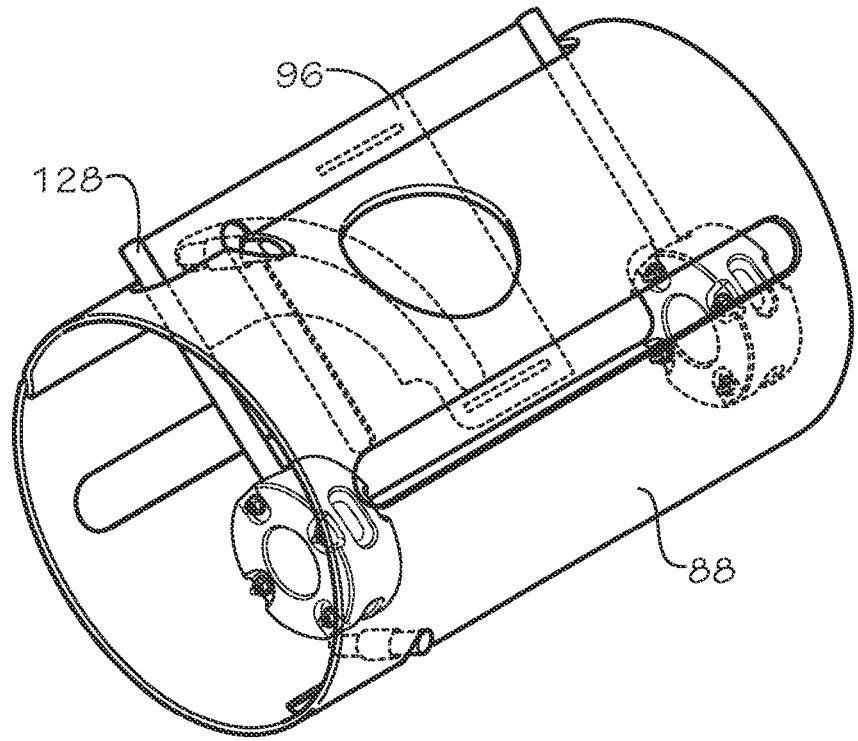
FIG. 9D is a perspective view of the cylinder and paddle assembly in the fourth rotated position as shown in FIG. 8D.

FIGS. 8A-D and FIGS. 9A-D show rotational positions of one of the paddles 96 relative to cylinder 88. For clarity in description, only one of the paddles 96 is shown, but it should be understood that the exemplary embodiment includes four paddles 96. Paddle assemblies 92, 94 are offset in cylinders 88, 90 toward the front of combine 10 so that paddles 96, 98 of paddle assembly 92, 94 extend the farthest from cylinders 88, 90 when in a directly front facing position (FIGS. 8A and 9A). Rotation of cylinders 88, 90 causes rotation of paddle assemblies 104, 106 through engagement of paddles 96, 98 within cylinder slots 100, 102, the paddle hub assemblies being freely rotatable. That is, trailing side walls or edges of cylinder slots 100, 102 engage paddles 96, 98 extending through the slots. Rotational force applied against paddles 96, 98 moves the paddles in the direction of rotation of cylinders 88, 90 Accordingly, as any cylinder slot 100, 102 in cylinders 88, 90 rotates from a directly forward facing position to a downward facing position (FIGS. 8B, 9B), the offset positioning of the paddle hub assemblies results in the paddles withdrawing from a fully forward extended position to a partly retracted downward position. Further rotation of cylinders 88, 90 rotates the same cylinder slots to a directly rearward facing position (FIGS. 8C, 9C) in which paddles 96, 98 associated with the rearward facing cylinder slots 100, 102 are nearly fully retracted into cylinders 88, 90. Upon further rotation of cylinders 88, 90, so that the subject cylinder slots 100, 102 are upwardly facing (FIGS. 8D, 9D), the paddles 96, 98 associated there with begin to emerge once again and project outwardly partially from the upwardly positioned cylinder slots 100, 102. Upon further rotation completing one revolution, the paddles again fully emerge when forwardly facing and can engage crop material to move the material rearward as a second revolution occurs. Since the paddle legs 118, 120 are pivotally connected to hub collars 114, 116 the paddle legs tend to pivot about their respective pivot pin 126 connections. This allows paddles 96, 98 to assume the required angular orientation to remain aligned with the cylinder slots as the rotation of each continues eccentrically. Pivoting movement of paddle legs 118, 120 and therefore paddles 96, 98 is limited by the shapes of pivoting apertures 122, 124 as well as the widths of cylinder slots 100, 102 in which paddles 96, 98 are positioned.

Figure 10A:
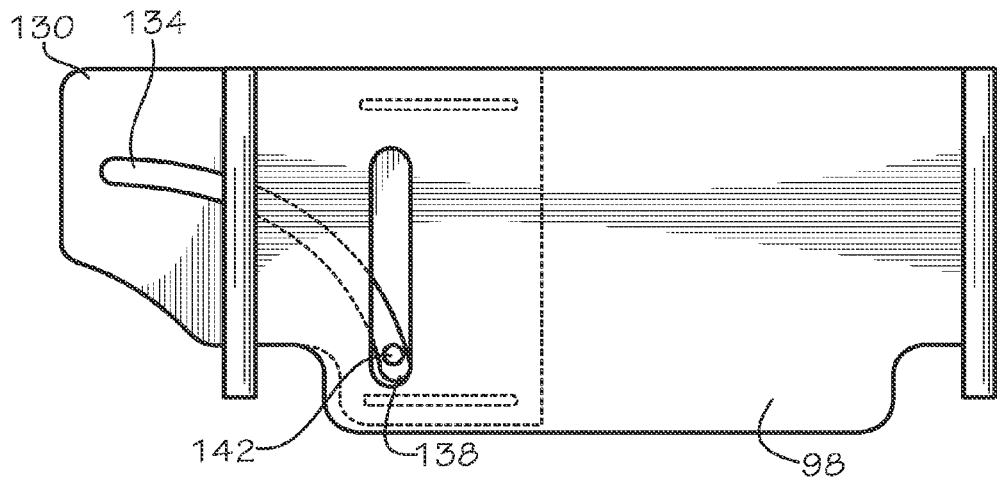
FIG. 10A is a plan view of a paddle and slidable wing in a first rotated position similar to that shown in FIGS. 8A and 9A.
Figure 10B:
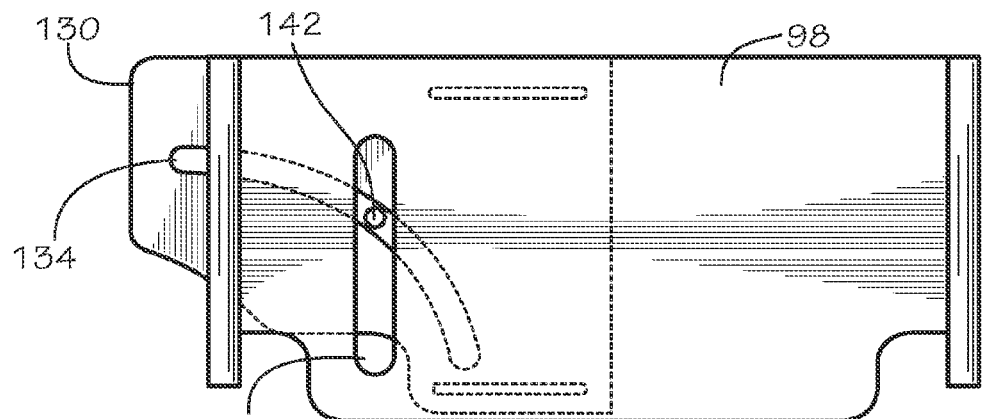
FIG. 10B is a plan view of a paddle and slidable wing in a second rotated position similar to that shown in FIGS. 8B and 9B.
Figure 10C:
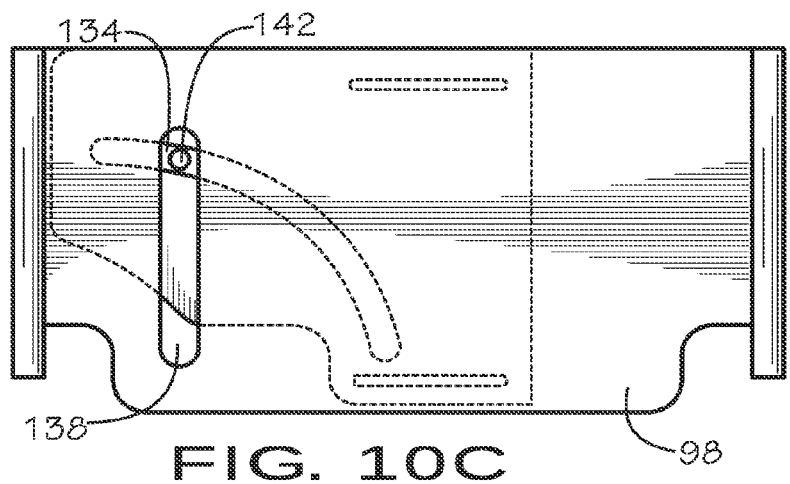
FIG. 10C is a plan view of a paddle and slidable wing in a third rotated position similar to that shown in FIGS. 8C and 9C.

As paddles 96, 98 retract and extend during rotation of cylinders 88, 90; slidable wings withdraw laterally inwardly and slide outwardly relative to cylinders 88, 90. That is, as paddles 96, 98 move from a fully extended position to a retracted position, slidable wings 128, 130 slide a laterally inwardly into cylinders 88, 90. As paddles 96, 98 move from fully withdrawn positions to extended positions, slidable wings 128, 130 slide laterally outwardly from cylinders 88, 90. FIGS. 10A, 10B and 10C illustrate, respectively, a fully extended position of a slidable wing, a partially retracted (or partially extended) position of the slidable wing and a fully withdrawn position of the slidable wing. As can be seen from the drawings and as described previously, when cylinders 88, 90 rotate, paddles 96. 98 retract and extend relative cylinders 88. 90. As the paddles move, guiding slots 136, 138 slide along rollers 140, 142 which remain in fixed positions. As paddles 96, 98 retract or extend, slidable wings 128, 130 move together there with, and arcuate slots 132, 134 following along rollers 140, 142. The arcuate paths defined by arcuate slots 132, 134 cause slidable wings 128, 130 to move inwardly as paddles 96, 98 are being retracted and to slide outwardly as paddles 96, 98 progressively move outward. Accordingly, in simultaneous fashion, both the paddle and its associated slidable wing retract or extend depending on the then position in which it is presented during the rotation of cylinders 88, 90. With paddles and wings aligned in the cross machine direction, positive material movement toward feeder housing 20 is provided between helical flights 78, 80. Since the paddles and wings each retract toward the rearward positions, interference from supporting structures is avoided.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvester, comprising:
   a chassis;
   a threshing and separating mechanism carried by said chassis;
   a feeder housing carried by said chassis and configured to supply crop material to said threshing and separating mechanism; and
   a header carried by said chassis in front of said feeder housing, said header including a cutting mechanism configured to cut crop material and an infeed assembly carried behind said cutting mechanism configured to direct the cut crop material toward said feeder housing, said infeed assembly including:
      a driving element configured to rotate;
      a cylinder rotationally coupled to said driving element and having at least one cylinder slot formed therein; and
      a paddle assembly eccentrically positioned and rotationally held within said cylinder, said paddle assembly including:
         a paddle hub assembly having at least one paddle extending therefrom at least partially out of said at least one cylinder slot during rotation; and
         a laterally slidable wing connected to said paddle in a varying overlapping relationship as said cylinder is rotated.

2. The agricultural harvester according to claim 1, wherein said infeed assembly includes a second cylinder rotationally coupled to said drive element and a second paddle assembly eccentrically positioned and rotationally held within said second cylinder.

3. The agricultural harvester according to claim 2, wherein said second paddle assembly includes at least one paddle having a slidable wing slidable toward and away from said first mentioned slidable wing during co-rotation of said cylinders.

4. The agricultural harvester according to claim 1, wherein said paddle assembly includes a hub shaft held within said cylinder, said at least one paddle rotationally held on said hub shaft.

5. The agricultural harvester according to claim 1, wherein at least one of said plurality of openings formed in said cylinder is an elongated slot of sufficient width and length for accommodating retraction and extension of said paddle and said wing.

6. The agricultural harvester according to claim 1, wherein said paddle defines a guiding slot, said slidable wing defines an arcuate slot crossing said guiding slot, and a roller fixed in position relative to said cylinder extends through said overlapping guide slot and arcuate slot.

7. The agricultural harvester according to claim 6, wherein said paddle hub assembly includes hub collars, and said paddle includes paddle legs pivotally connected to said hub collars.

8. The agricultural harvester according to claim 6, wherein said infeed assembly includes a second cylinder rotationally coupled to said drive element and a second paddle assembly eccentrically positioned and rotationally held within said second cylinder.

9. The agricultural harvester according to claim 1, wherein said second paddle assembly includes at least a second paddle having a second slidable wing connected to said second paddle in a varying overlapping relationship as said second cylinder is rotated.

10. The agricultural harvester according to claim 9, wherein said second paddle defines a second guiding slot, said second slidable wing defines a second arcuate slot crossing said second guiding slot, and a second roller fixed in position relative to said second cylinder extends through said overlapping second guide slot and second arcuate slot.

11. An infeed assembly for a header of an agricultural harvester, comprising:
a driving element configured to rotate;
a cylinder rotationally coupled to said driving element and having a plurality of cylinder slots formed therein; and
a paddle assembly eccentrically positioned and rotationally held within said cylinder, said paddle assembly including:
a plurality of paddles each variably positioned through a different one of said cylinder slots dependent on a rotational position of said driving element; and
each paddle having a laterally slidable wing connected thereto in a varying overlapping relationship dependent on said rotational position.

12. The infeed assembly according to claim 11, further including:
a second cylinder rotationally coupled to said driving element and having a second plurality of cylinder slots formed therein; and
a second paddle assembly eccentrically positioned and rotationally held within said second cylinder, said second paddle assembly including:
a second plurality of paddles each variably positioned through a different one of said second plurality of cylinder slots dependent on the rotational position of said driving element; and
each paddle of said second plurality of paddles having a laterally slidable wing connected thereto in a varying overlapping relationship dependent on said rotational position.

13. The infeed assembly according to claim 12, wherein each paddle defines a guiding slot, each slidable wing defines an arcuate slot crossing said guiding slot of the paddle with which it operates, and a plurality of rollers is provided fixed in positions relative to said cylinders, and each said roller extends through a different overlapping guide slot and arcuate slot of a paddle and slidable wing pair.

14. The infeed assembly according to claim 12, wherein paddles of said first plurality of paddles are aligned with paddles of said second plurality of paddles in a cross-machine direction.

15. The infeed assembly according to claim 11, wherein each paddle defines a guiding slot, each slidable wing defines an arcuate slot crossing said guiding slot of the paddle with which it operates, and a plurality of rollers is provided fixed in position relative to said cylinder, and each said roller extends through a different overlapping guide slot and arcuate slot of a paddle and slidable wing pair.

16. An infeed assembly for a header of an agricultural harvester, comprising:
a driving element configured to rotate;
first and second opposed helical flights rotationally connected to said driving element a paddle conveyor assembly positioned between said first and second helical flights, said paddle conveyor assembly including:
a cylinder rotationally coupled to said driving element and having a plurality of cylinder slots formed therein; and
a paddle assembly eccentrically positioned and rotationally held within said cylinder, said paddle assembly including:
a plurality of paddles each variably positioned through a different one of said cylinder slots dependent on a rotational position of said driving element; and
each paddle having a laterally slidable wing connected thereto in a varying overlapping relationship dependent on said rotational position.

17. The infeed assembly according to claim 16, said paddle conveyor assembly further including:
a second cylinder rotationally coupled to said driving element and having a second plurality of cylinder slots formed therein; and
a second paddle assembly eccentrically positioned and rotationally held within said second cylinder, said second paddle assembly including:
a second plurality of paddles each variably positioned through a different one of said second plurality of cylinder slots dependent on the rotational position of said driving element; and
each paddle of said second plurality of paddles having a laterally slidable wing connected thereto in a varying overlapping relationship dependent on the rotational position.

18. The infeed assembly according to claim 17, wherein each paddle of said first and second pluralities of paddles defines a guiding slot, each slidable wing defines an arcuate slot crossing said guiding slot of the paddle with which it operates; and a plurality of rollers is provided fixed in position relative to said cylinders, and each said roller extends through said overlapping guide slot and arcuate slot of a paddle and slidable wing pair.

19. The infeed assembly according to claim 17, wherein paddles of said first plurality of paddles are aligned with paddles of said second plurality of paddles in a cross-machine direction, and wings of said aligned paddles retract and extend away from and toward one another.

20. The infeed assembly according to claim 16; wherein each paddle defines a guiding slot, each slidable wing defines an arcuate slot crossing said guiding slot of the paddle with which it operates, and a plurality of rollers is provided fixed in positions relative to said cylinder, and each said roller extends through said overlapping guide slot and arcuate slot of a paddle and slidable wing pair.

* * * * *